P. J. ROONEY.
TIDE POWER MOTOR.
APPLICATION FILED NOV. 1, 1919.

1,401,559.

Patented Dec. 27, 1921.
3 SHEETS—SHEET 1.

INVENTOR
BY Patrick J. Rooney
ATTORNEY

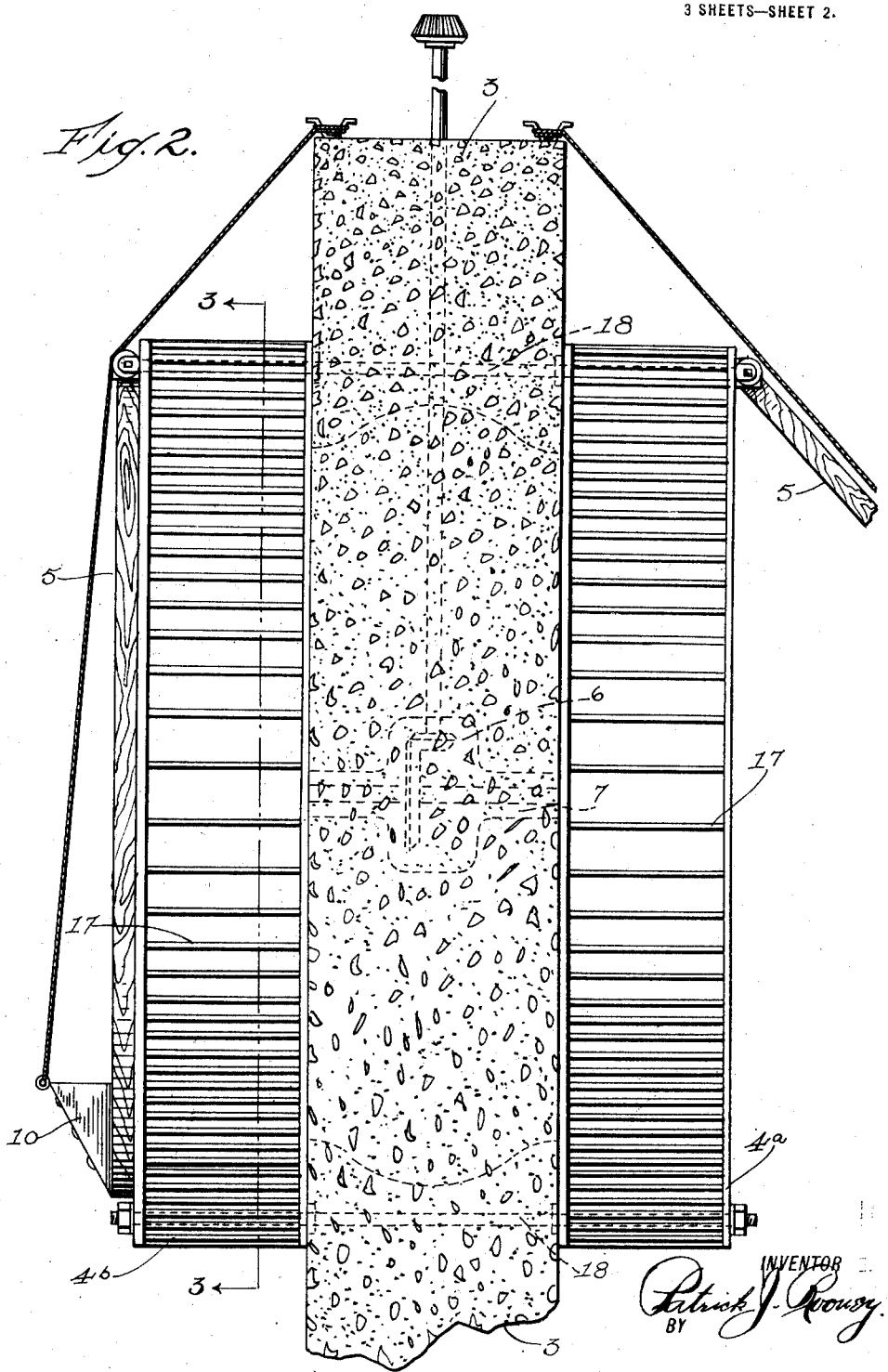

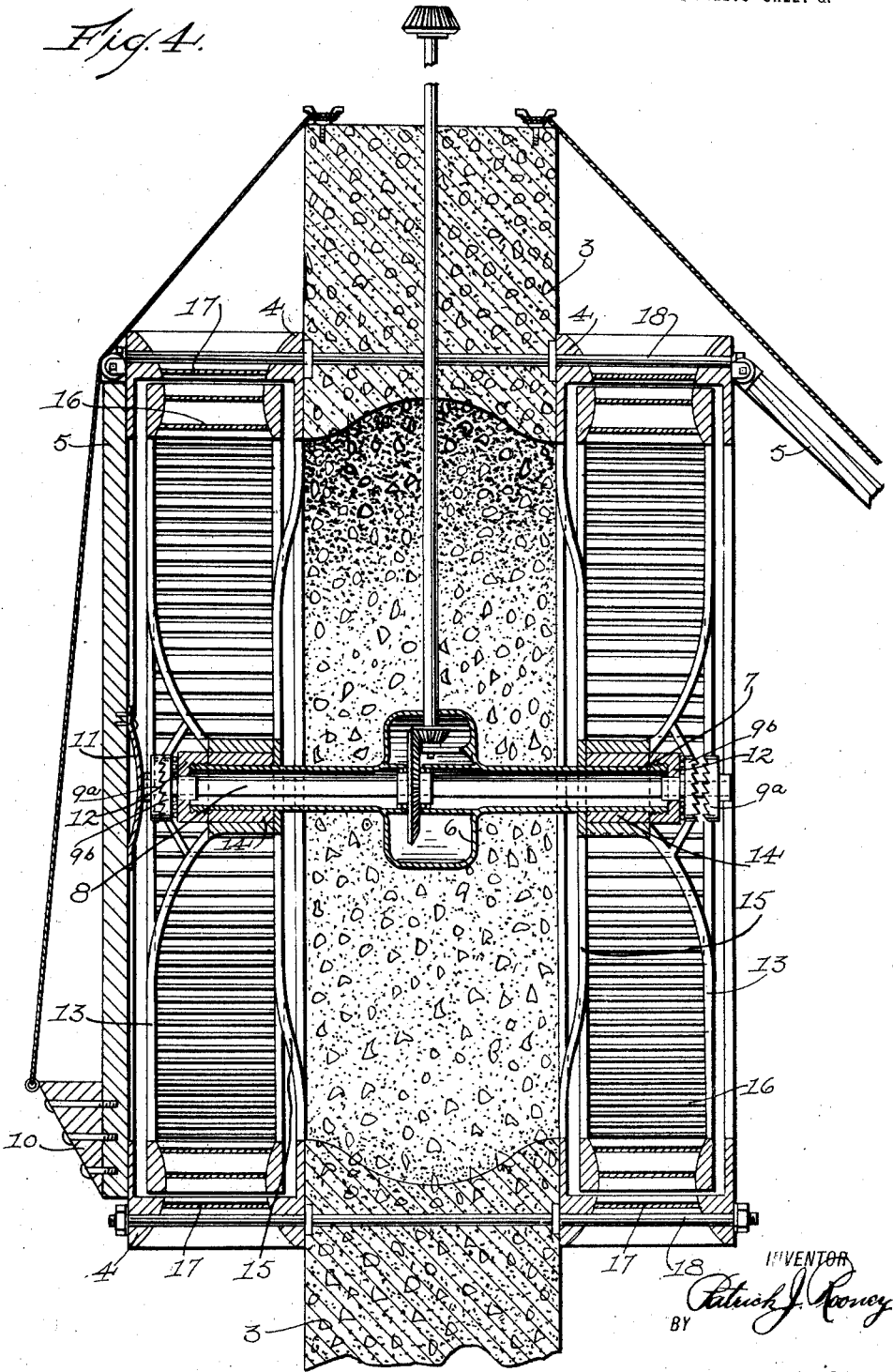

UNITED STATES PATENT OFFICE.

PATRICK J. ROONEY, OF NEW ROCHELLE, NEW YORK.

TIDE-POWER MOTOR.

1,401,559.  Specification of Letters Patent.  Patented Dec. 27, 1921.

Application filed November 1, 1919. Serial No. 334,917.

*To all whom it may concern:*

Be it known that I, PATRICK J. ROONEY, a citizen of the United States, residing at No. 106 Clove road, city of New Rochelle, county of Westchester, and State of New York, have invented a new and useful Tide-Power Motor for utilizing the rise and fall of the tides so as to produce motive power, of which the following is a specification.

My invention relates to tide-water turbine motors and has for its objects, first, to provide an improved apparatus of this kind which can be inexpensively constructed and installed; second, to provide an apparatus which can be installed without the expensive and extensive construction of conduits and gates in or under dams as heretofore necessary when using turbines in connection with tide water; third, to provide a motor which will operate automatically on either the rising or falling tide; fourth, to provide means of controlling the motor by hand when it is not desired that it should operate automatically; fifth, to provide a pair of horizontal opposed turbine motors operating alternately and so constructed that they both actuate the same shaft and turn it always in the same direction; sixth, to provide a mechanism by which the operative turbine wheel should be automatically connected with the power conveying shaft while the inoperative turbine should be automatically disconnected; seventh, to provide an apparatus of this character capable of being set in a concrete block forming part of a wall or dam without danger of the parts of the said apparatus getting out of line; and eighth to provide a tide operated turbine easily removable for repairs and with all of the parts thereof easily accessible for inspection.

Figure 1:
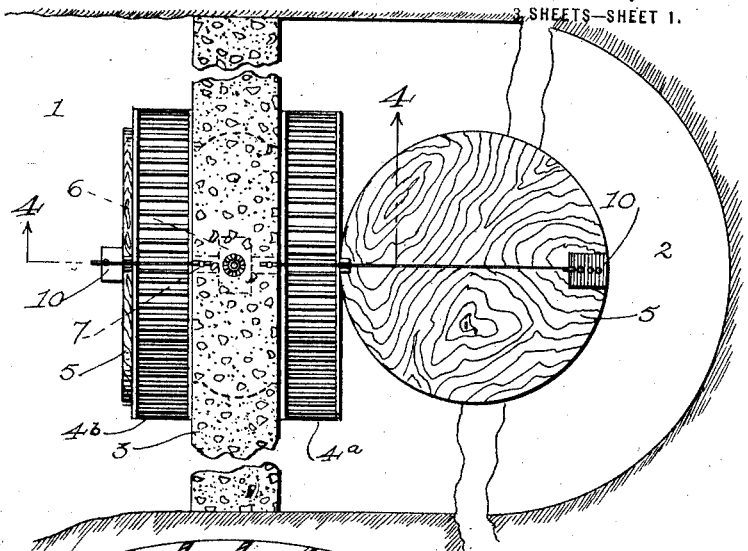
Figure 3:
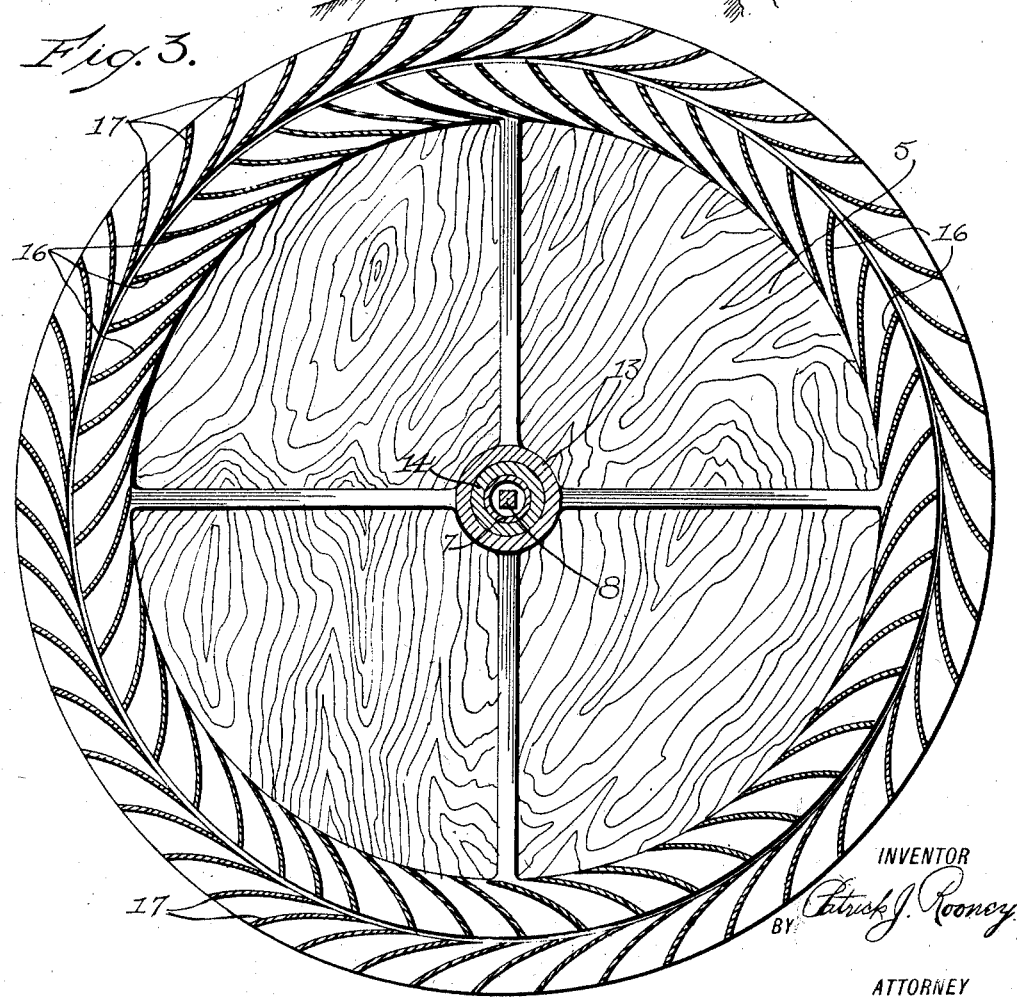

I attain these objects by the mechanism illustrated in the accompanying drawings, which show a preferred embodiment of my invention and in which Figure 1 is a plan showing the sea or other body of tide water, a reservoir separated from the sea by a dam and this mechanism set in and against the said dam. Fig. 2 is a side elevation of a portion of the dam showing this mechanism so set as to cover on both sides a passage through said dam. Fig. 3 is a plan of the turbine wheel and case. One wheel and case only being shown, and it is to be understood that the wheels and cases on both sides of the dam are of similar construction. And Fig. 4 is a vertical section showing both turbines, the passage through the dam and the shaft and connecting mechanism.

Similar numerals refer to similar parts throughout the several views.

The sea or other body of tide water 1 is separated from the reservoir or cove 2 by the dam 3. The horizontal opposed inward flow radial turbines $4^a$ and $4^b$ are set below low water level in a cement block forming part of said dam and they cover on each side a hole or passage extending through said cement block forming part of said dam. The back casing of each turbine is cut away leaving a circular opening forming a continuation of the passage through the said dam, and the said circular openings are covered by hinged flap-valves 5. A gear case 6, from which extends a cylindrical shaft housing 7, incloses a bevel gear through which passes a jack-shaft 8 the ends of which extend to beyond the outer extremities of the turbine wheels on both sides of the dam and on each end of this jack shaft is affixed one member of a ratchet toothed clutch $9^a$ the companion member of which $9^b$ is fastened to the spider 13 of the turbine wheel on each side. A weight 10 is fastened to the lower end of the wooden hinged flap valves in order to overcome the reserve buoyancy of the same and to keep them normally closed except when automatically opened by pressure of water from the inside, and a large flat leaf spring 11 semi-elliptic in form is fastened to the inside of the said flap valves so as when the flap valve closes to strike the end of the jack shaft and drive its clutch half into engagement with its companion clutch half attached to the turbine wheel. The cylindrical shaft housing 7 also forms a dead axle upon which the turbine wheels revolve and it is capped on both ends with a cap 12 which contains a bearing for the therein contained jack-shaft and this cap also holds in place the turbine wheel by contact with the bearing thereof 14 which at the other end is in contact with the braces 15 which extend from the wheel case to the said combined shaft housing and axle and furnish a fixed and strong support for the same. The wheel vanes 16 and guide blades 17 are shown to illustrate a type of turbine which may be utilized in this combination, but I do not confine myself to the proportions, angles or type illustrated. Thus the outer casing 4 of each turbine and the arms 15 extending therefrom, remain stationary and support the shaft-housing 7 which also remains stationary. The bearings illustrated at the point where the arms 15 join the shaft-housing 7 are for contact with the hub of the turbine wheel as a thrust-bearing for the latter. The turbine wheels together with the thereunto annexed spiders 13 and the bearings 14 rotate around the shaft housing 7. Each turbine wheel also has a clutch-half 9$^b$ affixed to its spider arms and this clutch-half always rotates with the turbine wheel when it is turned by the flow of tide-water, and it is through this clutch-half that the power of the moving turbine wheel is transmitted to the jack-shaft 8 by the engagement thereof with the companion clutch-half 9$^a$ as hereinafter explained. The turbine wheels are assembled on the shaft-housing 7 as follows. After the wheel is placed inside its case, the case arms and then the wheel hub are slipped over the outer end of the shaft housing and then the wheel is slipped farther inward on the said shaft-housing, while the cap 12 is held between the wheel spider 13 and the clutch-half 9$^b$ and thus, as this slipping progresses, the jack-shaft which has an end projecting from the shaft-housing, will come into contact with the bearing hole in the center of the cap 12, which is then screwed on to the end of the shaft-housing 7 and as the sides of this cap contact with the bearings 14 in the wheel hubs this screwing on of the cap moves the wheel in on the shaft housing until its hub comes into firm bearing contact with the arms 15 on the other side of the said hub. At the same time this will bring the end of the jack-shaft out through the center of the cap and through the ball bearing and through the clutch halves 9$^b$ and 9$^a$ and the jack shaft is then firmly bolted to the latter. This being done the cap 12 is fastened in position by a set screw and the turbine cases are bolted to the tie rods 18 and are firmly held against the cement dam. Thus the entire mechanism is firmly supported, the turbine cases, the shaft-housing 7, the arms 15 and the cap 12 at all times remain stationary while the turbine wheels, spiders 13, clutch-halves 9$^b$ and hub-bearings 14 rotate about the shaft-housing which supports them and is itself supported by the arms 15 extending from the turbine cases 4 which are held against the cement by the tie rods 18. The jack-shaft, 8 which rotates when either of its clutch-halves 9$^a$ is engaged with either of its companion clutch-halves 9$^b$ on whichever wheel is in motion, is of such length that it extends straight through both wheels and for a distance beyond the same and has a clutch-half 9$^a$ on each of its ends and is of such length that when, by being slid longitudinally one of its clutch-halves is brought into engagement with the clutch-half of one turbine wheel, the clutch-half on its other end is by the same motion slid out of engagement with the other turbine wheel. Thus only one wheel can be connected to the power-transmission mechanism at the same time. But this longitudinal sliding of the jack-shaft necessitates an unfixed engagement thereof with the large gear which is fixedly supported in mesh with the small gear by ball bearings as illustrated, and so the jack-shaft is squared for a considerable distance where it passes through the gear hub and the gear hub has a squared bore. Thus the gear will always be rotated by the shaft so long as any part of the squared surfaces are in contact. The purpose of this construction is as follows: Since only one of these turbine wheels will operate at a time, that wheel must be engaged with the shaft while the other is disengaged from the shaft at that time. Therefore by making the jack-shaft of the proper length and fastening a clutch-half on both of its ends, when one end of the jack-shaft is moved into engagement with one wheel, the other end thereof is moved out of engagement with the other wheel. Moreover as the closing of the flap-valves 5 is the agency by which the jack-shaft is slid into engagement with the wheel on the same side of the dam where the flap-valve is closing it follows that the jack shaft will be engaged with the wheel on that side of the dam where the pressure is the higher and disengaged from the wheel on the side of the dam where the pressure is the lower, as is more fully explained hereafter. The action of the automatic valves, as can be seen from the drawings which illustrate their construction, is governed by their form and the surfaces against which they seat. They are affixed to the outer, flat surfaces of the turbine cases and when closed form an essential part thereof, and prevent the tide-water from entering the wheel case except through the vanes in the usual manner. They are hinged at the top and can only open outwardly and away from the dam, and as the inner surfaces of these valves are open to water pressure communicated from the opposite side of the dam through the water passage which extends therethrough, they will automatically open when the water pressure on the opposite side of the dam is greater, as when the water level is higher, on the said opposite side of the dam; by thus opening they allow an unrestricted egress for the discharge water of the opposite wheel which is then working, and when, by the action of the tide, the water level again changes the open valve will close, thereby striking with its spring 11 against the end of the jack-shaft and engaging it with its turbine wheel which will now be the one to turn and the valve formerly closed will open, the wheel on its side will be disconnected from the jackshaft and will stand still and the water from the opposite wheel will be discharged through it and the open valve behind it. Thus when the flap-valve on one side of the dam is open the other is closed and vice versa. And this opening and closing automatically result from the same unbalanced water pressures arising from the lack of equilibrium between the two bodies of water on opposite sides of the dam which is the force that operates each turbine wheel in turn. Ropes are illustrated as attached to the flap-valves and running thence to the top of the dam but these are for use only when it is desired that the valves should not operate automatically as from their construction, as illustrated, they otherwise would. A plurality of tie-rods 18 are used to hold the two horizontal opposed turbines rigidly in juxtaposition with each other and also serve by being embedded in the cement wall to support the entire mechanism.

The apparatus illustrated may for convenience in setting up the same, be installed in a dam built across an excavation in the adjoining land and the water connections made with the sea and the reservoir after the installation is complete. This method of installing my invention is also useful where there is much wave motion in the main body of water.

The operation is as follows: When the tide rises and the water level on the sea side is higher than that on the reservoir side of the dam the flap valve on the sea side will close at the same time engaging the jackshaft with the turbine wheel on the sea side of the dam and disengaging the other end of the jack shaft from the turbine wheel on the other side of the dam. The water will flow from the higher level of the sea to the lower level of the reservoir, turning the wheel on the sea side of the dam and passing out through the opening made by raising the flap valve on the reservoir side of the dam. When, by the tidal change the levels are reversed, the flap valve on the reservoir side of the dam will close and the other flap valve will open the jack shaft will be connected with the wheel on the reservoir side of the dam and disconnected from the opposite wheel and the water will pass back to the sea through the passage in the wall and the opening left uncovered by the flap valve in the case of the turbine on the sea side. Thus each wheel becomes alternately operative and inoperative.

If the area of the reservoir is small in proportion to the size of the passage through the dam a manually operated gate should also be provided to close the passage until sufficient working head is obtained. Otherwise no such gate will be required. Instead of a bevel gear and jack-shaft a slidable crankshaft may be used or a belt and pulley may be mounted on the longitudinally slidable jack-shaft.

Various modifications may be made in my invention and I do not confine myself to the particular embodiment illustrated except in so far as I may be limited by the scope of the appended claims.

I claim:

1. In a tide water motor system, the combination of a dam provided with an opening therethrough below the low water level, a turbine case fixedly mounted over each end of the said opening, a shaft housing extending through said opening and cases fixedly mounted therein, a turbine loosely mounted on each end of said housing and provided with a clutch member integral therewith and having inwardly extending teeth, a shaft loosely mounted in said housing, a clutch member having outwardly extending teeth fixed on each end of said shaft opposite the clutch members first-mentioned, a gear wheel mounted on said shaft, a weighted flap valve mounted on the outermost end of each of said cases, and an inwardly projecting spring fixed on the inner side of the said valves opposite the said clutches.

2. In a tide water motor, the combination of flap-valves on the outside of, and arranged over openings for the discharge water through, the cases of two horizontal-opposed-inward flow-radial turbines, a dam separating two bodies of tide water, a conduit through the said dam below low water level and in water tight connection with each of the said turbine cases, two inward-flow-radial turbines fixedly mounted on opposite sides of the said dam over the ends of the said conduit, and power transmitting means for the said turbines, substantially as described.

3. In a tide water motor system the combination of two horizontal-opposed-inward-flow-radial turbines arranged in water tight connection over the ends of a conduit through a dam separating two bodies of tide water, outwardly opening valves supported over passageways for discharge water in each turbine case, a dam separating two bodies of tide water, a conduit through the said dam below low water level and power transmitting means for the said turbines, substantially as described.

PATRICK J. ROONEY.

Witnesses:
WALTER LAIER,
MARK J. KATZ.